(12) United States Patent
Inoue et al.

(10) Patent No.: US 6,564,692 B2
(45) Date of Patent: May 20, 2003

(54) BRAKE BOOSTER

(75) Inventors: Hidefumi Inoue, Saitama-Ken (JP); Yoshiyuki Hiratsuka, Saitama-Ken (JP); Yasushi Mori, Saitama-Ken (JP); Takasaki Yoshiyasu, Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/998,430

(22) Filed: Nov. 29, 2001

(65) Prior Publication Data
US 2002/0069751 A1 Jun. 13, 2002

(30) Foreign Application Priority Data

Dec. 13, 2000 (JP) ........................................ 2000-378775
Oct. 29, 2001 (JP) ........................................ 2001-331240

(51) Int. Cl.[7] ................................................. F15B 9/10
(52) U.S. Cl. ..................................... 91/369.3; 91/376 R
(58) Field of Search ............................ 91/369.2, 369.3, 91/376 R

(56) References Cited

U.S. PATENT DOCUMENTS 6,408,738 B1 * 6/2002 Harth et al. ............... 91/369.2

FOREIGN PATENT DOCUMENTS

| JP | 10-35474 | | 2/1998 | |
|---|---|---|---|---|
| JP | 3070672 | | 4/1999 | |
| WO | WO-00/13953 | * | 3/2000 | ................ 91/369.2 |

* cited by examiner

*Primary Examiner*—F. Daniel Lopez
(74) *Attorney, Agent, or Firm*—Flynn, Thiel, Boutell & Tanis, P.C.

(57) ABSTRACT

A first vacuum valve seat 17 is formed on a valve body 3, and a second vacuum valve seat 18 is formed on a tubular member 21 which is slidably mounted on the valve body 3. A lever member 41 is provided between the tubular member 21 and a valve plunger 14, and when the valve plunger 14 strokes through a given stroke or more relative to the valve body 3, the lever member 41 moves angularly to retract the tubular member 21 rearward relative to the valve body 3. When a brake pedal is quickly depressed, the lever member 41 moves angularly to cause an engaging tab 41f to engage an engaging recess 44 formed in the valve body 3, thus retaining the tubular member 21 at a position which is reached as it is retracted rearward relative to the valve body 3. This allows an atmosphere valve 33 to be opened to a greater opening than during a usual operation, allowing an increased output to be obtained rapidly. The present invention allows an output from a brake booster to be increased rapidly as an immediate response to a quick depression of the brake pedal.

9 Claims, 10 Drawing Sheets during a normal brake operation during an emergency brake operation

BRAKE BOOSTER

FIELD OF THE INVENTION

The invention relates to a brake booster, and more particularly, to a brake booster which assures that an increased output can be obtained in response to a force of depression of a small magnitude which is applied to a brake pedal in the event a braking effort of an increased magnitude is required as in an emergency brake.

DESCRIPTION OF THE PRIOR ART

A brake booster which is arranged to permit an increased output to be obtained even in response to a brake depressing force of a small magnitude as in an emergency brake which requires a braking effort of an increased magnitude is known in the art, as exemplified by Japanese Patent No. 3,070,672 disclosing a brake booster in which in response to an input which exceeds a given value, an output gradient is increased subsequently to increase the output, or a Japanese Laid-Open Patent Application No. 35,474/1998 disclosing a brake booster in which an operation of a brake pedal is electrically detected, and the output is increased in response thereto.

However, drawbacks are pointed out with conventional brake boosters as mentioned above. Specifically, in the brake booster disclosed in '672 patent, the arrangement is such that the output is increased when the input has exceeded the given value, and accordingly, the output cannot be immediately increased in response to a quick depression of the brake pedal.

On the other hand, in the brake booster disclosed in Application No. 35,474/1998, there is a need to provide a solenoid operated valve and a sensor which detects the degree of depression of the brake pedal in an integral manner with the booster, resulting in a complicated arrangement and an increased manufacturing cost of the brake booster.

SUMMARY OF THE INVENTION

In view of the foregoing, it is an object of the present invention to provide a brake booster which is simple in construction and which is capable of immediately increasing the output in response to a quick depression of a brake pedal.

Specifically, the present invention relates to a brake booster including a valve body slidably disposed within a shell, a power piston mounted on the valve body, a constant pressure chamber disposed forwardly of the power piston within the shell, a variable pressure chamber disposed rearwardly of the power piston within the shell, a valve mechanism disposed within the valve body for controlling a switching between the supply/discharge of a fluid to and from the variable pressure chamber, and an input shaft for operating the valve mechanism, the valve mechanism comprising a valve plunger connected to the input shaft and having an atmosphere valve seat, a vacuum valve seat formed within the valve body and a valve element which can be seated upon the atmosphere valve seat and the vacuum valve seat. According to the first aspect of the present invention, the brake booster further comprises a tubular member slidably disposed within the valve body and having the vacuum valve seat formed thereon, retainer means for causing the tubular member to be retracted relative to the valve body so that the vacuum valve seat is seated upon the valve element when the input shaft is advanced from its inoperative position through a given stroke relative to the valve body, and for retaining the tubular member at a position which is reached by retracting through a given stroke relative to the valve body, and release means for releasing the retention of the tubular member by the retainer means to allow the tubular member to return to its inoperative position when the input shaft returns to its inoperative position.

The second aspect of the present invention relates to a brake booster including a valve body slidably disposed within a shell, a power piston mounted on the valve body, a constant pressure chamber formed forwardly of and a variable pressure chamber formed rearwardly of the power piston within the shell, a valve mechanism disposed within the valve body for switching a supply/discharge of a fluid to or from the variable pressure chamber, and an input shaft for operating the valve mechanism, the valve mechanism comprising a valve plunger connected to the input shaft and having an atmosphere valve seat formed thereon, a first vacuum valve seat formed on the valve body and a valve element which can be seated upon the atmosphere valve seat and the first vacuum valve seat. According to the second aspect of the present invention, the brake booster further comprises a tubular member slidably disposed within the valve body and having a second vacuum valve seat juxtaposed to the first vacuum valve seat, retainer means for causing the tubular member to be retracted relative to the valve body to permit the second vacuum valve seat to be seated upon the valve element when the input shaft is advanced from its inoperative position through a given stroke relative to the valve body and for retaining the tubular member at a position which is reached by retracting through a given stroke relative to the valve body, and release means for releasing the retention of the tubular member by the retainer means to allow the tubular member to return to its inoperative position when the input shaft has returned to its inoperative position.

With the described arrangement, during an emergency brake operation in which a brake pedal is quickly depressed, the input shaft is advanced from its inoperative position through a given stroke or more relative to the valve body, whereby the tubular member is caused to retract relative to the valve body. Consequently, the vacuum valve seat (second vacuum valve seat) formed on the tubular member and the valve element which is seated thereon are caused to retract through a given stroke or more relative to the valve body and are retained in such positions by the retainer means. This allows an atmosphere valve which is formed by the combination of the atmosphere valve seat and the valve element to be opened to a greater opening than during a normal operation, allowing the atmosphere to be rapidly introduced into the variable pressure chamber to enable an output from the brake booster to increase rapidly to a greater value. In this manner, there is provided a brake booster which is simple in construction and which is capable of immediately increasing the output in response to a quick depression of a brake pedal.

Above and other objects, features and advantages of the invention will become apparent from the following description of the embodiments thereof with respect to the attached drawings.

DETAILED DESCRIPTION OF THE EMBODIMENTS

Figure 1:
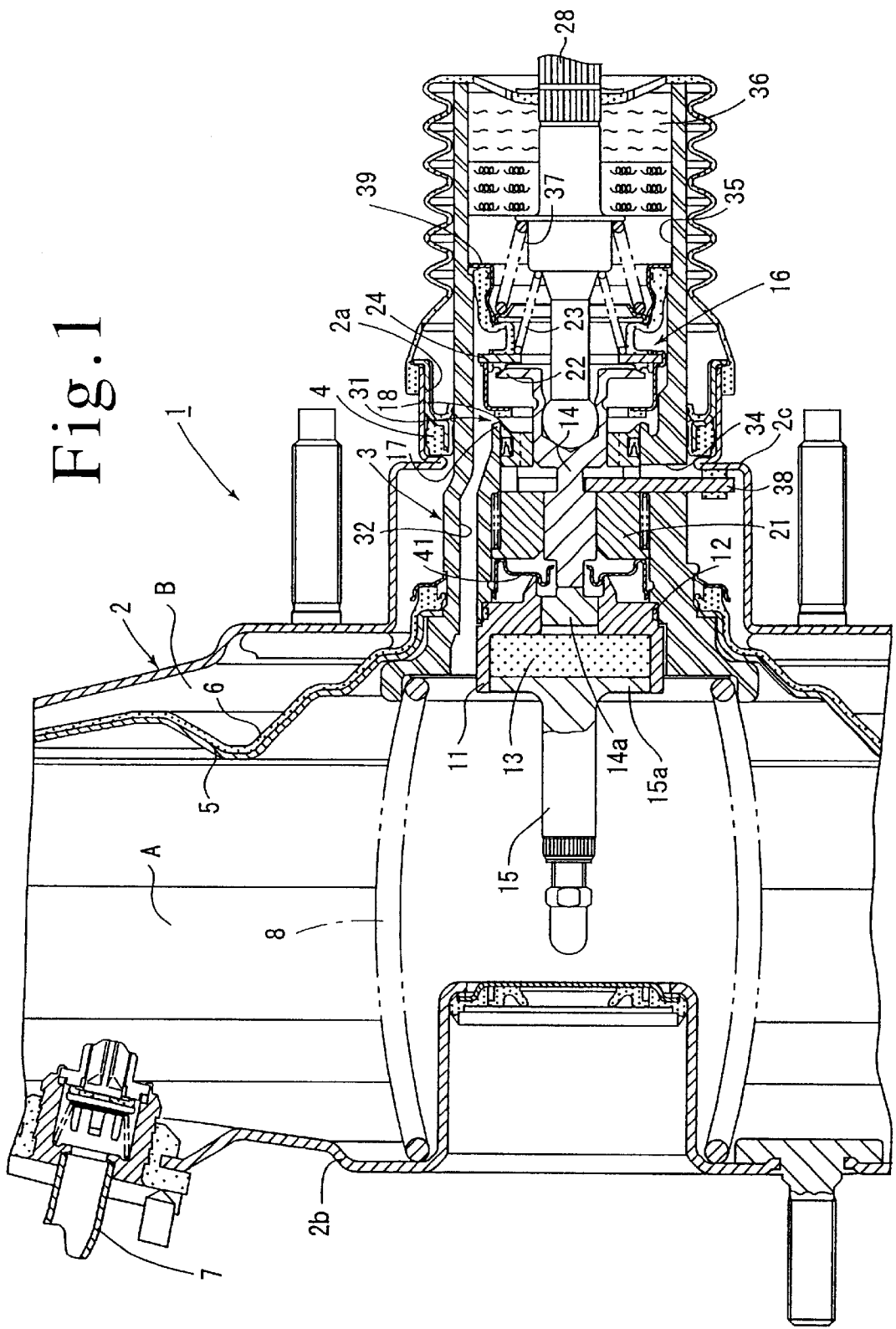
FIG. 1 is a cross section of a first embodiment of the present invention.

Referring to the drawings, several embodiments of the present invention will now be described. Initially referring to FIGS. 1 and 2, a brake booster 1 has a shell 2, in which a substantially tubular valve body 3 is slidably disposed. Toward the rear end, the outer periphery of the valve body 3 projects externally through a rear opening 2a of the shell 2 in which an annular seal member 4 is disposed to maintain a hermetic seal between the outer periphery of the valve body 3 toward the rear end and the opening 2a in the shell 2.

A power piston 5 is connected around the outer periphery of the valve body 3, and a diaphragm 6 is applied to the back surface of the power piston 5, thus partitioning the interior of the shell 2 into a forwardly located constant pressure chamber A and a rearwardly located variable pressure chamber B.

The shell 2 has a front wall 2b, to which a negative pressure introducing tube 7 is connected, through which a negative pressure is normally introduced into the constant pressure chamber A. A return spring 8 is disposed within the constant pressure chamber A to urge the valve body 3 normally rearward, and accordingly, in the inoperative condition of the brake booster 1 shown in FIGS. 1 and 2, the valve body 3 as urged by the return spring 8 remains at rest in its inoperative position shown.

In the present embodiment, a holder 11 in the form of a stepped cylinder is fitted into the inner periphery of the valve body 3 toward its front end. An annular seal member 12 maintains a hermetic seal between the outer periphery of the holder 11 and the inner periphery of the valve body 3. In effect, the holder 11 constitutes part of the valve body 3, and the holder 11 may be formed integrally with the valve body 3. Toward the front end, the holder 11 includes an increased diameter portion 11a in which a reaction disc 13 is received, and the outer periphery of a plate plunger 14a, which forms a part of a valve plunger 14, is slidably fitted into the inner periphery of the holder 11 at a location rearward of the increased diameter portion 11a. In this manner, the reaction disc 13 and the valve plunger 14 are disposed in opposing relationship with each other. Toward the rear end, the holder 11 includes a reduced diameter portion 11b, the outer periphery of which is tapered, thus reducing its diameter toward the rear end.

An output shaft 15 is disposed forwardly of the reaction disc 13, and has one end 15a which is slidably fitted into the increased diameter portion 11a of the holder 11 to abut against the reaction disc 13 from the front side thereof. In this manner, the reaction disc 13 is held sandwiched between the rear end face of the end 15a of the output shaft 15 and the stepped end face of the holder 11.

An opening is formed in the front wall 2b of the shell 2 to allow a housing and a piston of a master cylinder, not shown, to be inserted in the constant pressure chamber A, and the front end of the output shaft 15 is disposed in abutment against the piston of the master cylinder.

A valve mechanism 16 which switches a communication between the constant pressure chamber A and the variable pressure chamber B and the communication between the variable pressure chamber B and the atmosphere is received within the valve body 3.

The valve mechanism 16 of this embodiment comprises an annular first vacuum valve seat 17 formed on the inner periphery of the valve body 3, a tubular member 21 slidably fitted into the inner periphery of the valve body 3 while maintaining a hermetic seal therewith and having a rear end on which a second vacuum valve seat 18 is formed, a valve plunger 14 slidably fitted into and extending though the tubular member 21 and formed with an atmosphere valve seat 22 at its rear end, and a valve element 24 which is adapted to be seated on the both vacuum valve seats 17, 18 and the atmosphere valve seat 22 from the rear side under the resilience of a spring 23.

The valve element 24 comprises a first member 25 which is located forwardly and formed of a rigid body, and a second member 26 which is located rearwardly and formed of rubber and connected to the first member 25. A rubber ring is attached on the front side of the first member 25 to define a first seat area SI. A plate 27 which is formed of a rigid body is mounted on the front side of the second member 26 and an annular rubber member is applied to the plate 17 to define a second seat area S2. The atmosphere valve seat 22 which is formed on the valve plunger 14 is located inside the first member 25 to be disposed in opposing relationship with the second seat area S2. The spring 23 extends between the plate 27 and an input shaft 28, thus normally urging the valve element 24 forward.

In the present embodiment, the both vacuum valve seats 17, 18 are juxtaposed to be adjacent to each other radially of the valve body 3. A combination of the both vacuum valve seats 17, 18 and the first seat area S1 on the valve element 24 which moves into engagement with or disengagement from the valve seats defines a vacuum valve 31. A space located radially outward of the vacuum valve 31 communicates with the constant pressure chamber A through a constant pressure passage 32 formed in the valve body 3.

A combination of the atmosphere valve seat 22 formed on the valve plunger 14 and the second seat area S2 on the valve element 24 which moves into engagement with or disengagement from the valve seat 22 defines an atmosphere valve 33. A space located between the vacuum valve 31 and the atmosphere valve 33 communicates with the variable pressure chamber B through a variable pressure passage 34, which is formed by a radial opening formed in the valve body 3.

A space located radially inward of the atmosphere valve 33 communicates with the atmosphere through an atmosphere passage 35 formed in the valve body 3 and a filter 36 disposed therein.

A rear end of the valve plunger 14 is pivotally connected with a front end of the input shaft 28, and a spring 37 having a greater resilience than the spring 23 is disposed between a retainer 39 fitted into the valve body 3 and the outer periphery of the input shaft 28. The other end of the input shaft 28 is connected to a brake pedal, not shown.

A key member 38, which is known in itself, passes through the variable pressure passage 34 in the valve body 3, and then passes through a radial opening in the tubular member 21 before it is engaged with an engaging portion 14b of the valve plunger 14.

Figure 2:
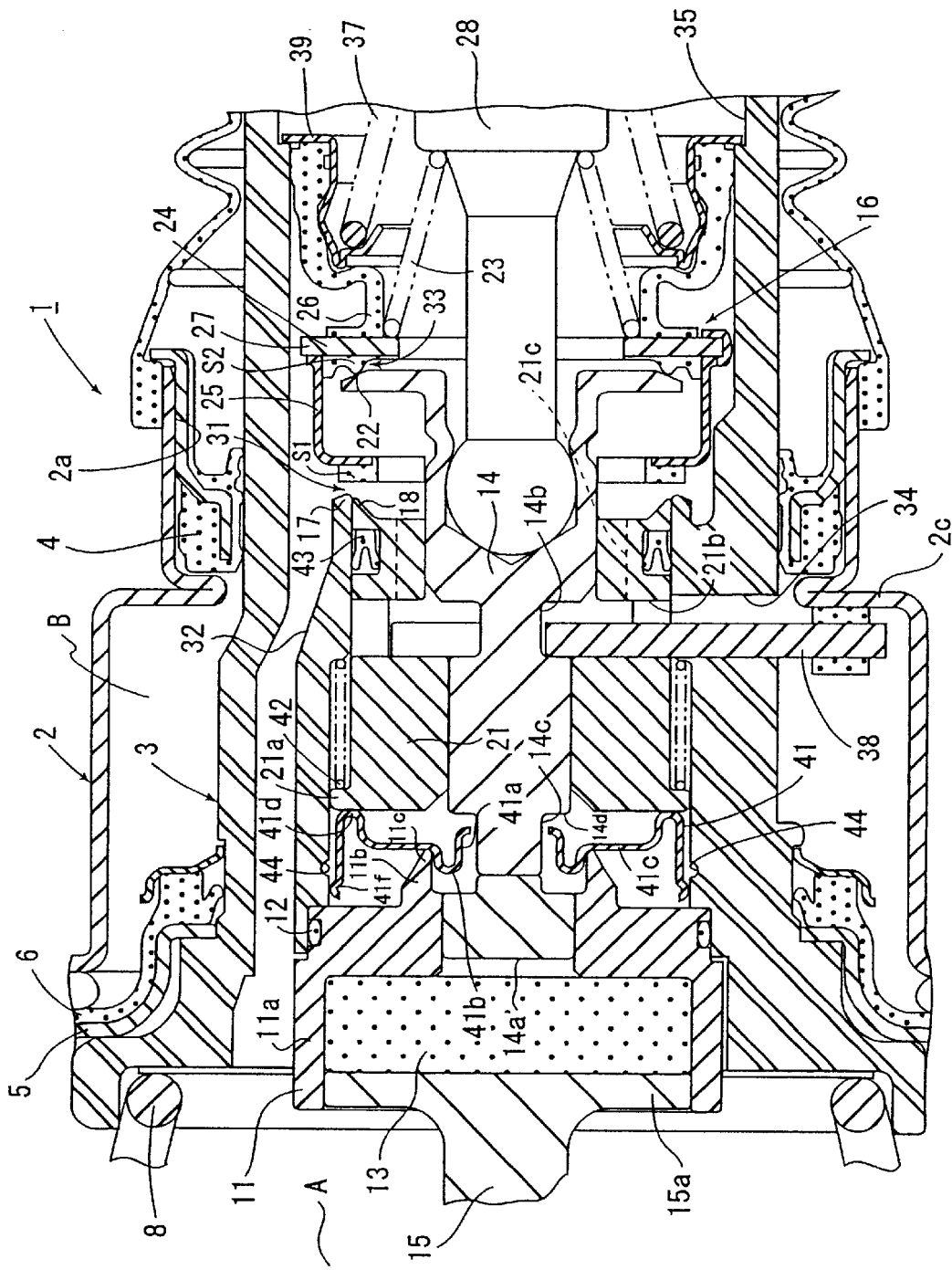
FIG. 2 is an enlarged view of an essential part shown in FIG. 1.

Since the valve body 3 is normally urged rearward by the return spring 8, in the inoperative condition of the brake booster 1 shown in FIGS. 1 and 2, the key member 38 abuts against a rear wall 2c of the shell 2. A front end face of the variable pressure passage 34 is disposed in abutment against the key member 38 as are the front end face of the radial opening 21b formed in the tubular member 21 and the front end face of the engaging portion 14b of the valve plunger 14.

When the key member 38 is disposed in abutment against the rear wall 2c of the shell 2 in this manner, the key member 38 and the valve plunger 14 are maintained at a given position relative to the valve body 3, thus reducing a lost motion of the input shaft 28 at the commencement of operation of the brake booster 1.

In the inoperative condition, the second seat area S2 on the valve element 24 is seated on the atmosphere valve seat 22 to close the atmosphere valve 33, while the first seat area S1 of the valve element 24 is removed from the both vacuum valve seats 17, 18 to open the vacuum valve 31. Under this condition, the chambers A and B communicate with each other, and a negative pressure is introduced into the both chambers.

In the inoperative condition, the rear end face of the reaction disc 13 is slightly spaced from the opposing plate plunger 14a. By contrast, when the input shaft 28 and the valve plunger 14 are driven forward to actuate the brake booster 1, the reaction disc 13 bulges rearward under the influence of a reaction to the output acting upon the output shaft 15, whereby the end face of the reaction disc 13 abuts against the plate plunger 14a. A reaction to the output acting upon the output shaft 15 begins to be transmitted from this point in time to the valve plunger 14, the input shaft 28 and the brake pedal, not shown, through the reaction disc 13.

In the present embodiment, a lever member 41 is provided in the valve body 3 premising the described arrangement, in order to allow an output from the brake booster 1 to be rapidly increased immediately in response to a quick depression of the brake pedal.

Figure 3:
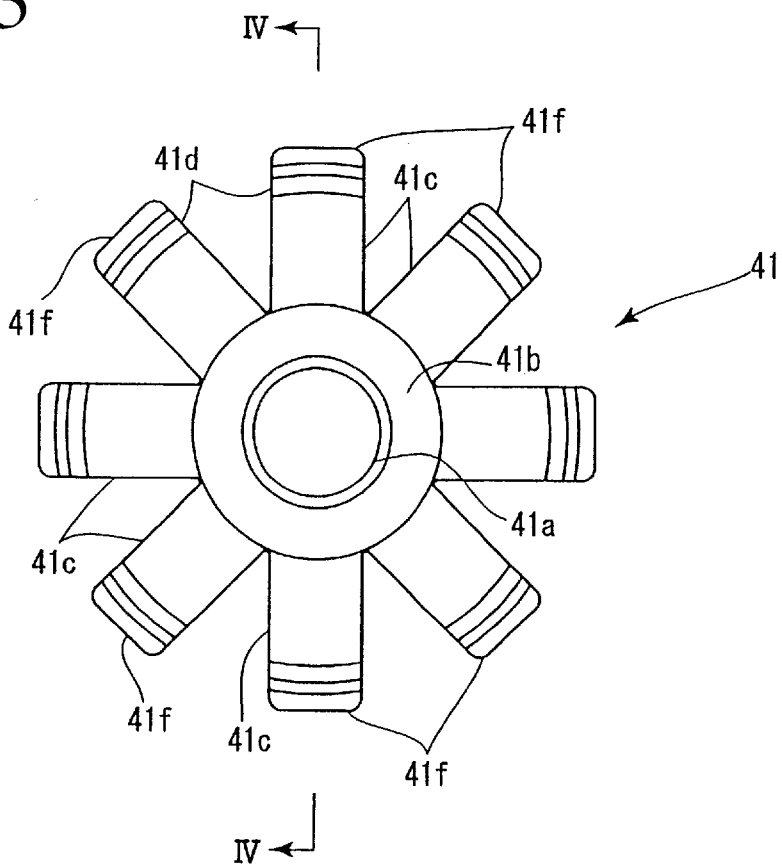
FIG. 3 is a front view of a lever member 41 shown in FIG. 1.
Figure 4:
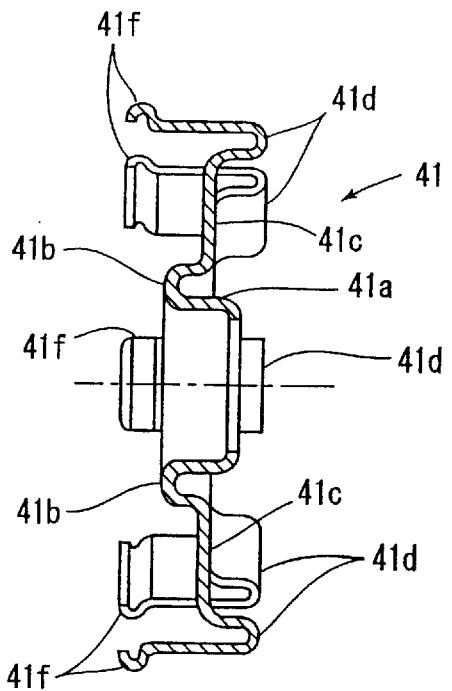
FIG. 4 is a cross section taken along the lines IV—IV shown in FIG. 3.

Specifically, referring to FIGS. 2 to 4, the lever member 41 is formed of a spring steel to exhibit resilience. The lever member 41 includes a cylindrical portion 41a of a reduced diameter in its radially inner portion, and the front end of the cylindrical portion 41a then extends radially outward through a given distance and is subsequently folded back upon itself to provide an annular fitting portion 41b, which in turn continues to eight radial portions 41c which extend radially outward. The outer end of each radial portion 41c then extends rearwardly and is folded upon itself forwardly to define an abutment 41d, which continues forwardly to provide an engaging tab 41f which is arcuate in section at the distal end thereof, the tab 41f bulging radially outward.

The lever member 41 thus constructed serves as retainer means, with the cylindrical portion 41a being positioned in a space outward of the reduced diameter portion 14c at the front end of the valve plunger 14, the annular fitting portion 41b being loosely fitted around the reduced diameter portion 11b of the holder 11 from the rear side, and the eight engaging tabs 41f being disposed in contact with the inner periphery of the valve body 3. The arrangement is such that the rear end 11c (the rear end of the reduced diameter portion 11b) of the holder 11 abuts against a boundary between the annular fitting portion 41b and the radial portion 41c of the lever member 41 to provide a fulcrum for the angular movement of the lever member 41, and the eight abutments 41d of the lever member 41 abut against the front end face of the tubular member 21 (see FIG. 2).

At its front end, the outer periphery of the tubular member 21 is formed with a flange 21f, and a spring 42 is disposed between the flange 21a and an opposing stepped end face of the valve body 3, thus normally urging the tubular member 21 forward relative to the valve body 3. Accordingly, when the lever member 41 is disposed in abutment against the tubular member 21, the outer portion of the lever member 41 is normally urged forward about the rear end 11c of the holder 11 which acts as the fulcrum for the angular movement.

At a given axial position along the length thereof, the tubular member 21 is formed with a radial opening 21b which radially extend therethrough, and is also formed with an axial groove 21c which continues from the radial opening 21b to the rear end face in an axial opening into which the valve plunger 14 is slidably fitted. The key member 38 is passed into the radial opening 21b in the tubular member 21 before engaging the engaging portion 14b of the valve plunger 14. Also, the radial opening 21b and the axial groove 21c formed in the tubular member 21 provide an internal space, through which a communication is permitted between the variable pressure passage 34 and the vacuum valve 31 and the atmosphere valve 33. An annular seal member 43 is provided around the outer periphery of the tubular member 21 toward the rear end, thus maintaining a hermetic seal between the tubular member 21 and the inner periphery of the valve body 3. The second vacuum valve seat 18 is provided by an annular projection formed on the rear end of the tubular member 21.

In the present embodiment, an engaging recess 44, which is provided by an annular groove, is formed in the inner peripheral surface of the valve body 3 at a location immediately rearward of the holder 11, and in the inoperative condition shown, the engaging tab 41f of the lever member 41 is located slightly forward of the engaging recess 44 formed in the valve body 3. By contrast, during an emergency brake operation which will be described later, because the valve plunger 14 and the input shaft 28 are driven forward through a given stroke or more relative to the valve body 3 and the holder 11, a step 14d of the valve plunger 14 which is located rearward of the reduced diameter portion 14c abuts against the rear end of the cylindrical portion 41a of the lever member 41 to urge it forward. Accordingly, the rear end 11c of the holder 11 acts as a center of angular movement, causing the radial portion 41c and its outer portion of the lever member 41 to be retracted rearward, thus causing the tubular member 21 to be retracted rearward relative to the valve body 3. Concomitantly, the engaging tab 41a of the lever member 41 becomes engaged with the engaging recess 44 in the valve body 3. As a consequence, the valve element 24 is caused to retract rearward under the condition that the second vacuum valve seat 18 formed on the tubular member 21 is seated on the first seat area S1. This allows the atmosphere valve 33 to be opened to a greater opening than during a normal operation, whereby the atmosphere is rapidly introduced into the variable pressure chamber B to allow the brake booster 1 to provide a greater output rapidly.

If the depression of the brake pedal is terminated under this condition, the input shaft 28 and the valve plunger 14 retract, and come to a stop upon abutment of the key member 38 against the rear wall 2c of the shell 2. This causes the tubular member 21 and the valve plunger 14 to return to their inoperative positions shown, and the valve body 3 retracts in retarded relationship thereto, and the front end face of the variable pressure passage 34 abuts against the key member 38, whereupon the valve body 3 comes to a stop and returns to its inoperative position. At this time, the tubular member 21 moves forward relative to the valve body 3, whereby the outer portion of the lever member 41 which abuts against the tubular member 21 moves forward, disengaging the engaging tab 41a of the lever member 41 from the engaging recess 44.

In the present embodiment, the tubular member 21 and the key member 38 constitute together release means which releases the retention of the tubular member 21 by the lever member 41.

With the described arrangement, in the inoperative condition of the brake booster 1 shown in FIGS. 1 and 2, the key member 38 abuts against the rear wall 2c of the shell 2, the valve body 3 is stationary as a result of the abutment of the front end face of the variable pressure passage 34 against the key member 38, and the tubular member 21 and the valve plunger 14 are also stationary as a result of the abutment of the front end face of the radial opening 21b in the tubular member 21 and the front end face of the engaging portion 14b of the valve plunger 14 against the key member 38.

In the inoperative condition, the second seat area S2 of the valve element 24 is seated on the atmosphere valve seat 22 to close the atmosphere valve 33. On the other hand, the engaging tab 41f of the lever member 41 is held removed from the engaging recess 44 in the valve body 3 by the tubular member 21 which abuts against the key member 38, and thus is located forwardly thereof. At this time, the rear end of the cylindrical portion 41a, which represents the inner periphery of the lever member 41, is spaced from the step 14d of the valve plunger 14. Accordingly, the second vacuum valve seat 18 formed on the tubular member 21 is located at a small distance forward of the first vacuum valve seat 17, and the both vacuum valve seats 17, 18 are removed from the first seat area S1 of the valve element 24 to open the vacuum valve 31. Accordingly, the chambers A and B communicate with each other, and the negative pressure is introduced into the both chambers. In the inoperative condition, the rear end face of the reaction disc 13 is slightly spaced from the plate plunger 14a.

Operation during a Usual Gentle Brake Depression

If brake pedal, not shown, is gently depressed in the inoperative condition mentioned above, the input shaft 18 and the valve plunger 14 are gently driven forward. As a consequence, the first seat area S1 of the valve element 24 is seated on the first vacuum valve seat 17 on the valve plunger 30 to close the vacuum valve 31, while the atmosphere valve seat 22 is spaced from the second seat are S2 of the valve element 24 to open the atmosphere valve 33.

Because the valve plunger 14 is gently driven forward at this time, the step 14d of the valve plunger 14 does not abut against the cylindrical portion 41a of the lever member 41, and thus the engaging tab 41f of the lever member 41 does not move relative to the valve body 3. In this manner, the vacuum valve 31 is closed while the atmosphere valve 33 is opened, allowing the atmosphere to be introduced into the variable pressure chamber B through the variable pressure passage 34.

Accordingly, a pressure differential between the negative pressure in the constant pressure chamber A and the atmosphere in the variable pressure chamber B drives the valve body 3 and the output shaft 15 forward. When the brake booster 1 is actuated in this manner, a reaction occurs from the output acting upon the output shaft 15 to cause the reaction disc 13 to bulge rearward, resulting in an abutment of the end face of the reaction disc 13 against the plate plunger 14a. From this point in time on, the reaction from the output acting on the output shaft 15 is transmitted through the reaction disc 13 to the valve plunger 14, the input shaft 28 and the brake pedal, not shown.

During the usual gentle brake operation as mentioned above, the valve plunger 14 is not advanced largely relative to the valve body 3, and accordingly the step 14d of the valve plunger 14 cannot abut against the cylindrical portion 41a of the lever member 41. Thus, there is no axial reciprocating movement of the tubular member 21 relative to the valve body 3, and as a consequence, the positional relationship between the both vacuum valve seats 17, 18 remain unchanged as in the inoperative condition shown in FIG. 2, and the first seat area S1 of the valve element 24 is seated on the first vacuum valve seat 17.

If the brake pedal is now released and the valve plunger 14 and the input shaft 28 retract rearward, the key member 38 abuts against the rear wall 2c of the shell 2 and comes to a stop. Subsequently, the front end face of the variable pressure passage 34 in the valve body 3 as well as the front end face of the radial opening 21b in the tubular member 21 both abut against the key member 38, whereby the valve body 3 and the tubular member 21 return to their inoperative positions shown.

Operation During Emergency Brake Operation

When the brake pedal is quickly depressed in the inoperative condition shown in FIGS. 1 and 2, the first seat area S1 of the valve element 24 becomes seated on the first vacuum valve seat 17 to close the vacuum valve 31 while the atmosphere valve seat 22 is removed from the second seat area S2 of the valve element 24 to open the atmosphere valve 33. This allows the atmosphere to be introduced into the variable pressure chamber B, whereby the valve body 3 is driven forward to actuate the brake booster 1. At this time, the transmission of the reaction to the valve plunger 14 through the reaction disc 13 is retarded with respect to the rate of depression of the brake pedal, and accordingly, the valve plunger 14 is advanced relative to the valve body 3 through an increased stroke as compared with the stroke which occurs during the gentle brake operation.

When the valve plunger 14 is advanced through a given stroke or more relative to the valve body 3 in this manner, the step 14d of the valve plunger 14 abuts against the cylindrical portion 41a of the lever member 41, thus driving the cylindrical portion 41a forward. Accordingly, the radial portion 41c, the abutment 41d and the engaging tab 41f of the lever member 41 retract rearward about the fulcrum of angular movement which is provided by the rear end 11c of the holder 11, whereby the tubular member 21 retracts rearward relative to the valve body 3 against the resilience of the spring 42.

This causes the second vacuum valve seat 18 to be seated on the valve element 24 which is already seated on the first vacuum valve seat 17, thus moving the valve element 24 away from the first vacuum valve seat 17 in a rearward direction. As a consequence, the opening of the atmosphere valve 33 (represented by a spacing between the atmosphere valve seat 22 and the second seat area S2) increases. Since at this time, the engaging tab 41ƒ of the lever member 41 is engaged with the engaging recess 44 in the valve body 3, the tubular member 21 is retained in a position which is reached by retracting through a given stroke relative to the valve body 3, and the first seat area S1 of the valve element 24 is retained in a position where it is seated on the second vacuum valve seat 18. Thus, the atmosphere valve 33 is opened to a larger opening than during a normal operation, rapidly introducing the atmosphere into the variable pressure chamber B to increase the output from the brake booster 1 rapidly. A reaction from the output causes the reaction disc 13 to bulge rearward, resulting in an abutment of the reaction disc 13 against the plate plunger 14a to urge the valve plunger 14 rearward. However, because the amount of bulge which the reaction disc 13 experiences until the atmosphere valve seat 22 on the valve plunger 14 becomes seated on the second seat area S2 of the valve element 24 is greater than the bulge which occurs during the usual operation, the output from the brake booster 1 increases by a corresponding amount. In this manner, there can be obtained an increased output from the brake booster 1 rapidly as an immediate response to a quick depression of the brake pedal.

During the emergency operation of the brake booster 1, the valve plunger 14 is driven back rearward to a degree as the force with which the brake pedal is depressed is reduced subsequently, but the tubular member 21 and the valve element 24 are maintained in the conditions mentioned above because the engaging tab 41ƒ of the lever member 41 serving as retainer means is maintained engaged with the engaging recess 44.

Release Operation

When the brake pedal is released in the emergency operation, the valve plunger 14 and the input shaft 28 retract, and accordingly, the atmosphere valve seat 22 is seated on the second seat area S2 of the valve element 24 to close the atmosphere valve 33, while the second vacuum valve seat 18 moves away from the first seat area S1 of the valve element 24 to open the vacuum valve 31. Accordingly, the atmosphere in the variable pressure chamber B is displaced into the constant pressure chamber A, causing the valve body 3 and the power piston 5 to retract toward their inoperative positions.

Subsequently, the key member 38 initially abuts against the rear wall 2c of the shell 2 and comes to a stop, and the valve plunger 14 and the tubular member 21 which are disposed in abutment against the key member 38 cannot retract any further and thus come to a stop at corresponding positions. On the other hand, the valve body 3 and the power piston 5 retract subsequently until the front end face of the variable pressure passage 34 abuts against the key member 38. Concomitantly, because the valve body 3 retracts rearward relative to the tubular member 21 which remains stationary, it follows that the abutment 41d and the engaging tab 41ƒ of the lever member 41 move forward relative to the valve body 3, whereby the engaging tab 41ƒ is disengaged from the engaging recess 44 in the valve body 3, resuming the inoperative condition shown in FIG. 2.

Thus it will be seen that an increased output can be obtained rapidly during an emergency brake operation in accordance with the present embodiment.

It will be seen that with the present embodiment, there can be provided a brake booster 1 which is capable of rapidly increasing an output during an emergency brake operation with a construction which is simple enough by merely adding the tubular member 21, the lever member 41 and the spring 42 to a conventional brake booster. In addition, the brake booster 1 provides a high reliability even during an emergency brake operation because of such a simple construction.

In the described embodiment, the lever member 41 is formed with the engaging tab 41ƒ while an annular groove serving as the engaging recess 44 is formed in the inner peripheral surface of the valve body 3. However, an engaging recess may be formed in the lever member 41 while an engaging tab may be formed on the valve body 3.

Second Embodiment

Figure 5:
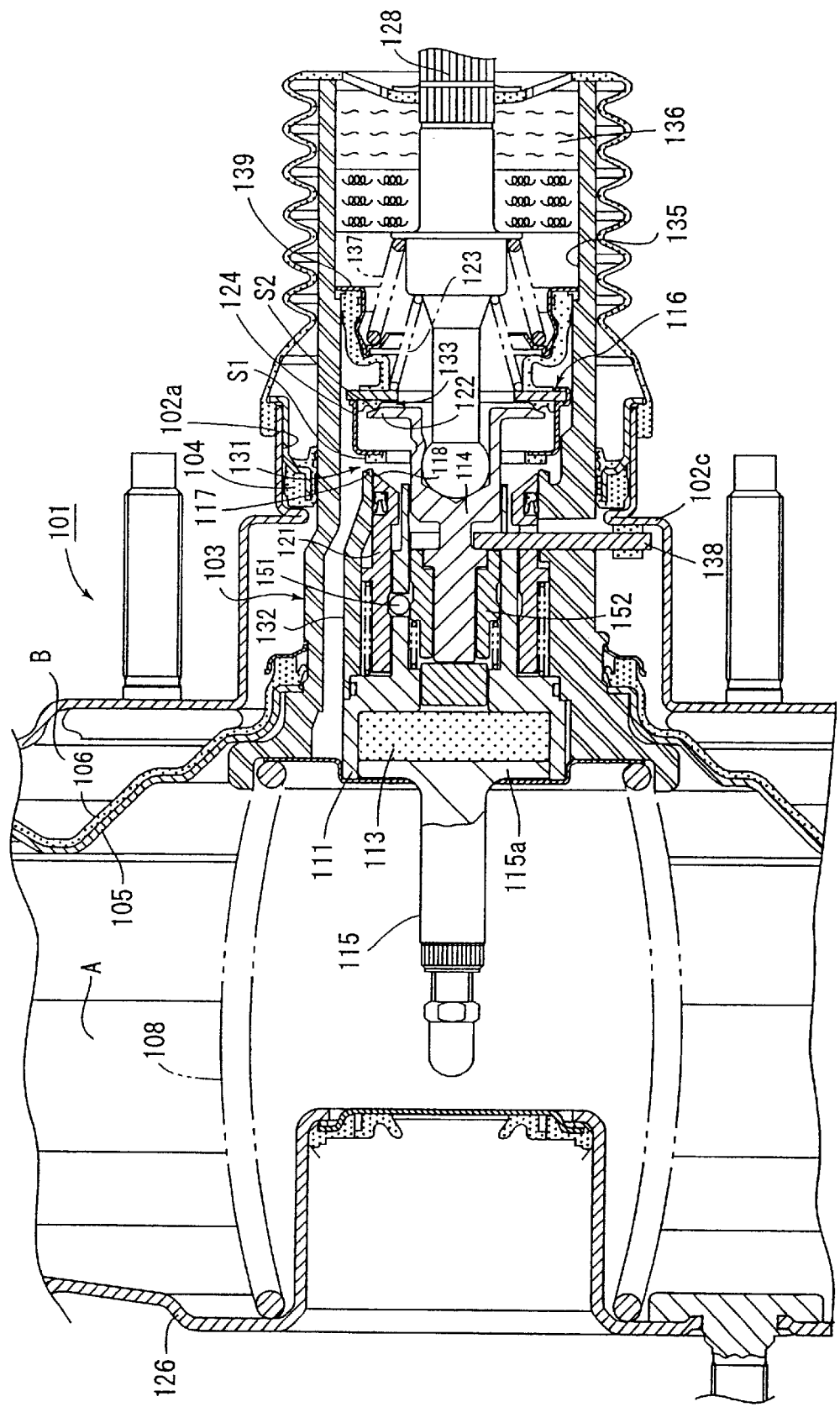
FIG. 5 is a cross section of a second embodiment of the present invention.
Figure 6:
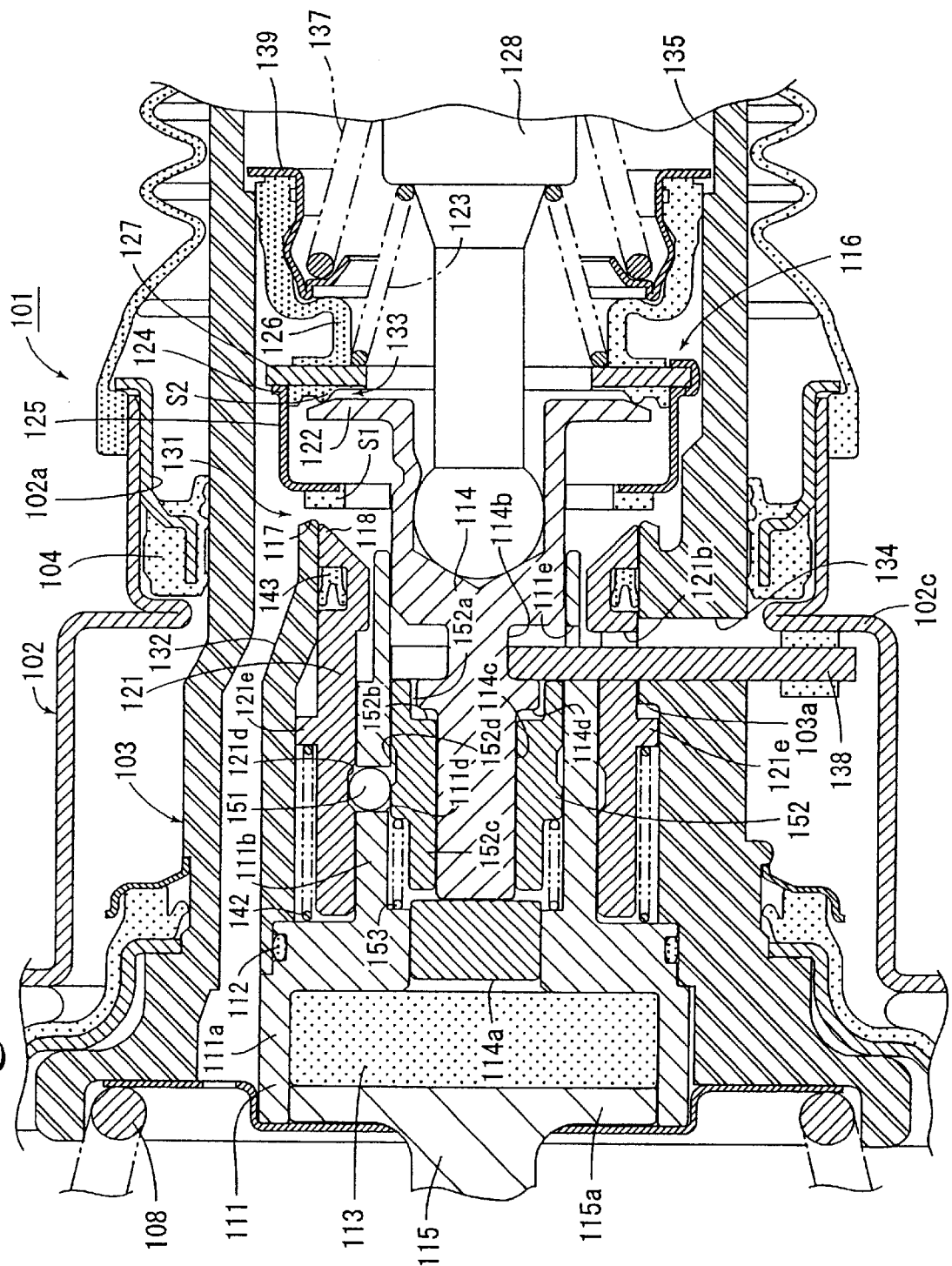
FIG. 6 is a cross section, to an enlarged scale, of an essential part shown in FIG. 5.

FIGS. 5 and 6 show a second embodiment of the present invention in which the lever member 41 and the engaging recess 44 used in the first embodiment are replaced by a ball 151 and a cylindrical retainer member 152 and related parts.

It is to be noted that in the description to follow, parts corresponding to those shown in the first embodiment are designated by like reference numerals as used before, to which 100 is added in the second embodiment.

Specifically, in the second embodiment, a holder 111 has a reduced diameter portion 111b which is extended axially in the rearward direction, creating a cylindrical space between the reduced diameter portion 101b and the inner peripheral surface of a valve body 103, and a cylindrical tubular member 121 is disposed in this space, and its inner periphery is slidably fitted over the reduced diameter portion 111b while the outer periphery of the tubular member 121, toward its rear end, is slidably fitted into the inner periphery of the valve body 103.

An annular projection 121e is formed around the outer periphery of the tubular member 121, and a spring 142 is disposed between the projection 121 and a stepped end face of the holder 111, thus normally urging the tubular member 121 rearward. It is to be noted that the inner periphery of the valve body 103 is formed with a stepped end face 103a at a location rearward of the annular projection 121e on the tubular member 121 so as to be disposed opposite thereto for defining a retracted end as the tubular member 121 is moved rearward relative to the valve body 103. In the similar manner as in the first embodiment, a second vacuum valve seat 118 is formed on the rear end of the tubular member 121. At a given axial position, the inner periphery of the tubular member 121 is formed with an annular groove 121d serving as an engaging recess which is engageable with a ball 151. The opposite end faces of the annular groove 121d are formed as inclined surfaces so that a spacing between the both end faces is at its maximum at the inner edge thereof.

At a given axial position, the reduced diameter portion 111b of the holder 111 is formed with a plurality of radial openings 111d which are spaced apart at an equal interval circumferentially, and a ball 151 is loosely fitted in each of the radial openings 111d. The ball 151 is formed of a metal, and has a spherical diameter which is slightly greater than the wall thickness of the reduced diameter portion 111b at the location where the radial opening 111d is formed. In this manner, each ball 151 is radially moveable along the radial opening 111d in which it is received.

Toward the rear end, the reduced diameter portion 111b of the holder 111 is formed with a radial through-opening 111e in alignment with the location of a variable pressure passage 134, and a key member 138 is passed through the through-opening 111e before it engages an engaging portion 114b of a valve plunger 114.

In the second embodiment, the reduced diameter portion 114c of the valve plunger 114 has an axial size which is chosen to be twice that of the first embodiment. A retainer member 152 is disposed in a space formed between the reduced diameter portion 101b located forward of the key member 138 and the valve plunger 114. The inner periphery of the retainer member 152 has a reduced internal diameter to provide a reduced diameter portion 152c toward the front end and has an increased diameter which is greater than that of the reduced diameter portion 152c to provide an increased diameter portion 152a toward the rear end, thereby forming a stepped end face 152b which faces rearward.

The outer periphery of the retainer member 152 is slidably fitted into the inner periphery of the reduced diameter portion 111b of the holder 111 while simultaneously placing the reduced diameter portion 152c of the retainer member 152 outside the reduced diameter portion 114c of the valve plunger 114 to surround it and to place the increased diameter portion 152a of the retainer member 152 so as to surround the outer periphery of a portion of the valve plunger 114 located rearward of the reduced diameter portion 114c. In this manner, the stepped end face 152b of the retainer member 152 and a step 114d of the valve plunger 114 which is located rearward of the reduced diameter portion 114c are disposed to oppose each other. A spring 153 is disposed between the retainer member 152 and the holder 111, thus normally urging the retainer member 152 rearward.

Accordingly, in the present embodiment, the ball 151 disposed within each radial opening 111d is prevented from being disengaged from the radial opening 111d by the inner peripheral surface of the tubular member 121 which is located outside and the outer peripheral surface of the retainer member 152 which is located inside.

In addition, at a given axial position, the outer peripheral surface of the retainer member 152 is formed with an annular groove 152d serving as an engaging recess which is engageable with the ball 151. The opposite end faces of the annular groove 152d are provided as inclined surfaces so that a spacing between the opposite end faces is at its maximum at the outer edges thereof.

In the inoperative condition of the brake booster 101 shown in FIGS. 5 and 6, the valve body 103, the tubular member 121, the retainer member 152 and the valve plunger 114 are disposed in abutment against the key member 138. The second vacuum valve seat 118 on the tubular member 121 is located forwardly of the first vacuum valve seat 117 on the valve body 103, and the ball 151 is urged outward by the outer peripheral surface of the retainer member 152 which is urged by the spring 153, whereby part of the ball 151 projects externally of the radial opening 111d to be located within the annular groove 121d in the tubular member 121.

By contrast, during an emergency operation in which the brake pedal is quickly depressed, the valve plunger 114 is also rapidly driven forward, whereby the step 114d of the valve plunger 114 abuts against the stepped end face 152b of the retainer member 152, causing the latter to be driven forward relative to the holder 111 and the valve body 103. At this time, the tubular member 121 moves rearward under the resilience of the spring 142, whereby the ball 151 abuts against the front inclined surface of the annular groove 121d.

The entire axial region of the annular groove 152d in the retainer member 152 is then positioned to overlap the radial opening 111d completely, and accordingly, the ball 151 is urged radially inward under the resilience of the spring 142 which is applied through the front inclined surface of the annular groove 121d, whereby part of the ball 151 projects beyond the inner end of the radial opening 151d to roll along the inclined surface of the annular groove 152d to engage the latter.

Part of the ball 151 which has been projecting externally of the radial opening 111d then sinks into the radial opening 111d, and the resilience of the spring 142 causes the tubular member 121 to move rearward relative to the valve body 103 and the holder 111 until the annular projection 121e abuts against the stepped end face 103a of the valve body 103, whereupon it comes to a stop (see FIGS. 7 to 10). Accordingly, the second vacuum valve seat 118 on the tubular member 121 which is moving rearward becomes seated on the valve element 124 which has been seated on the first vacuum valve seat 117, causing the valve element 124 to move away from the first vacuum valve seat 117 to be driven back rearward, thus opening the atmosphere valve 133 to a greater opening than during a usual operation. Consequently, the atmosphere is rapidly introduced into the variable pressure chamber B, allowing an increased output to be delivered from the brake booster 101 rapidly.

If the brake pedal is now released during the emergency operation, the key member 138 which is engaged with the valve plunger 114 that is now retracting to its inoperative position abuts against the rear wall 102c of the shell 2 and comes to a stop, and subsequently the rear end of the retainer member 152 and the front end face of the radial opening 121b in the tubular member 121 abut against the key member 138, whereby the tubular member 121 comes to a stop.

Because the valve body 103 continues to retract subsequently under the influence of the return spring 108, it follows that the tubular member 121 moves forward relative to the valve body 103 and the holder 111, and the entire axial region of the annular groove 121d in the tubular member 121 overlaps the radial opening 111d in the holder 111. Accordingly, the ball 151 is urged outward by the inclined surface of the annular groove 152d in the retainer member 152 which is urged by the spring 153, and continues to be urged outward by the front outer peripheral surface of the annular groove 152d. Thus, part of each ball 151 projects externally of the radial opening 111d to be positioned within the annular groove 121d in the tubular member 121, thus returning to the inoperative condition shown in FIGS. 5, 6 and 7.

It will be understood from the foregoing description that in the second embodiment, the tubular member 121, the retainer member 152, the springs 142 and 153 and the balls 151 together constitute retainer means, and the tubular member 121, the retainer member 152, the springs 142 and 153, the valve plunger 114 and the key member 138 together constitute release means. In other respects, the arrangement is similar to the first embodiment, and therefore will not be described.

Inoperative Condition

Figure 7:
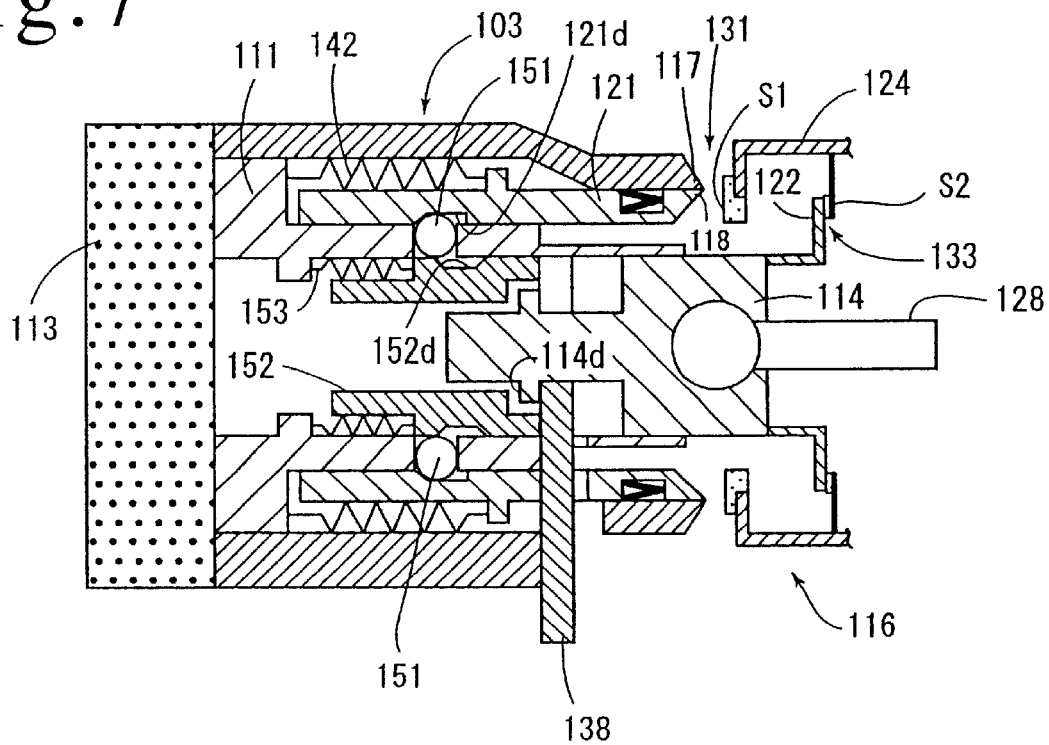
FIG. 7 is a cross section showing components of the second embodiment shown in FIG. 6 in a simplified form.
Figure 8:
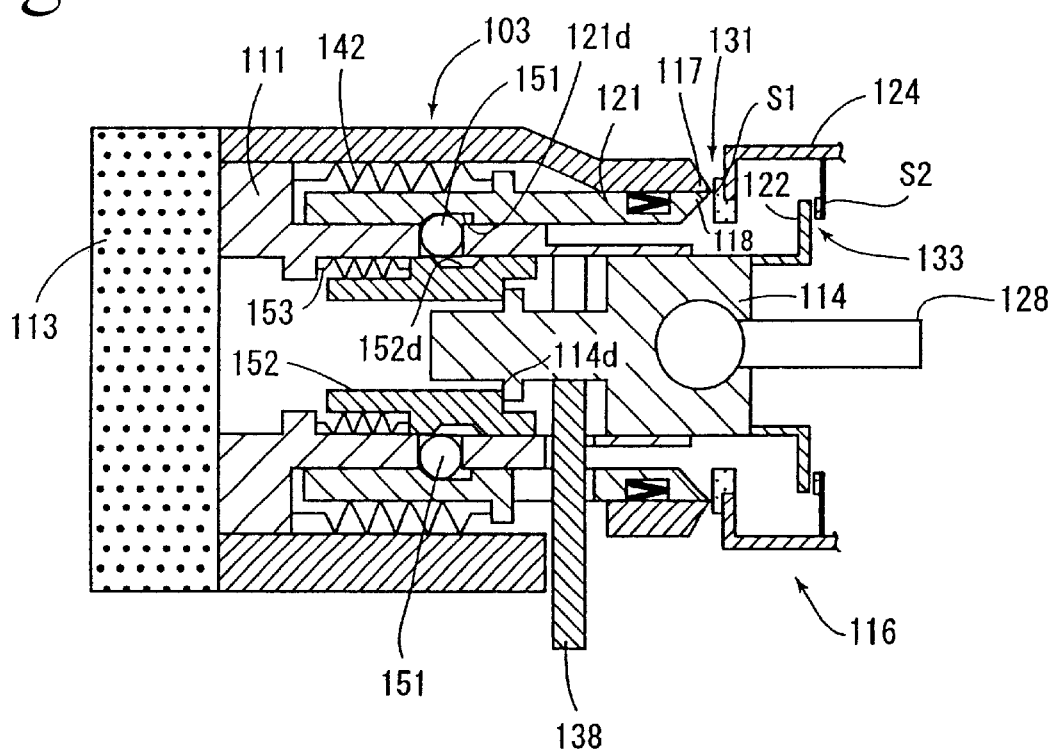
FIG. 8 is a cross section illustrating an operational phase of the components shown in FIG. 7 during an emergency operation.

With the described arrangement, in the inoperative condition of the brake booster 101 shown in FIGS. 5, 6 and 7, the key member 138 abuts against the wall 102c of the shell 102 and remains stationary, and the valve body 103, the tubular member 121, the retainer member 152 and the valve plunger 114 also abut against the key member 138 and remain stationary. The ball 151 is urged outward by the outer peripheral surface of the retainer member 152 which is urged by the spring 153, the ball 151 partly projecting externally of the radial opening 111d and being located within the annular groove 121d in the tubular member 121.

Accordingly, the second vacuum valve seat 118 formed on the tubular member 121 is located slightly forwardly of the first vacuum valve seat 117, and both vacuum valve seats 117, 118 are removed from the first seat area S1 on the valve element 124 to open the vacuum valve 131. On the other hand, the second seat area S2 on the valve element 124 is seated on the atmosphere valve seat 122 to close the atmosphere valve 133.

Accordingly, the chambers A and B communicate with each other, and a negative pressure is introduced into the both chambers. In the inoperative condition, the rear end face of the reaction disc 113 is slightly spaced from the opposing plate plunger 114a. The stepped end face 152b of the retainer member 152 and the opposing step 114d of the valve plunger 114 are also spaced apart.

Operation During Gentle Brake Depression

When the brake pedal, not shown, is gently depressed in the inoperative condition mentioned above, the input shaft 128 and the valve plunger 114 are gently driven forward. The first seat area S1 on the valve element 124 becomes seated on the first vacuum valve seat 117 to close the vacuum valve 131, and the second seat area S2 on the valve element 124 becomes removed from the atmosphere valve seat 122 to open the atmosphere valve 133. The retainer member 152 abuts against the valve plunger 114 under the resilience of the spring 153, and the tubular member 121 retracts under the resilience of the spring 142, causing the ball 151 to abut against the front inclined surface of the annular groove 121d in the tubular member 121. However, because the valve plunger 114 is gently driven forward, a distance through which the retainer member 152 is driven forward relative to the holder 111 is small if the step 114d of the valve plunger 114 abuts against the stepped end face 152b of the retainer member 152. Accordingly, the annular groove 152d in the retainer member 152 does not assume a position where it overlaps the radial opening 111d in the reduced diameter portion 111b of the holder 111, and thus the ball 151 is maintained as located within the annular groove 121d in the tubular member 121, preventing any movement of the tubular member 121 relative to the valve body 103.

Since the vacuum valve 131 is closed while the atmosphere valve 133 is opened, the atmosphere is introduced into the variable pressure chamber B through the variable pressure passage 134. A pressure differential between the negative pressure in the constant pressure chamber A and the atmosphere in the variable pressure chamber B drives the valve body 103 and the output shaft 115 forward.

When the brake booster 101 is actuated in this manner, a reaction from the output which is acting on the output shaft 115 causes the reaction disc 113 to bulge rearward, whereupon the end face of the reaction disc 113 abuts against the plate plunger 114a. From this point in time on, the reaction from the output acting on the output shaft 115 begins to be transmitted through the reaction disc 113 to the valve plunger 114, the input shaft 128 and the brake pedal, not shown.

It will be understood that during the usual gentle brake operation, the valve plunger 114 cannot be advanced through an increased stroke relative to the valve body 103 and the holder 111, and therefore the ball 151 cannot engage the annular groove 152d in the retainer member 152. Accordingly, there is no axial reciprocating movement of the tubular member 121 relative to the valve body 103. Thus, the positional relationship between both vacuum valve seats 117, 118 remains the same as in the inoperative condition shown in FIG. 6, and the first seat area S1 on the valve element 124 is seated on the first vacuum valve seat 117.

When the brake pedal is released after the brake booster has been actuated, the valve plunger 114 and the input shaft 128 retract; the key member 138 which is engaged with the valve plunger 114 comes to a stop by abutment against the rear wall 102c of the shell 102; followed by an abutment of the front end face of the radial opening 121b in the tubular member 121 and the rear end of the retainer member 152 against the key member 138 to stop their movement, and the valve body 103 also abuts against the key member 138 to return to its inoperative position as shown.

Emergency Operation

By contrast, during an emergency operation in which the brake pedal is quickly depressed, the first seat area S1 on the valve element 124 becomes seated on the first vacuum valve seat 117 to close the vacuum valve 131 while the atmosphere valve seat 122 moves away from the second seat area S2 on the valve element 124 to open the atmosphere valve 133. Since the transmission of a reaction from the reaction disc 113 to the plate plunger 114a is retarded in contrast to the valve plunger 114 which is rapidly driven forward, it will be seen that the valve plunger 114 is driven forward through a given stroke or more relative to the valve body 103 and the holder 111 (see FIG. 8).

Figure 9:
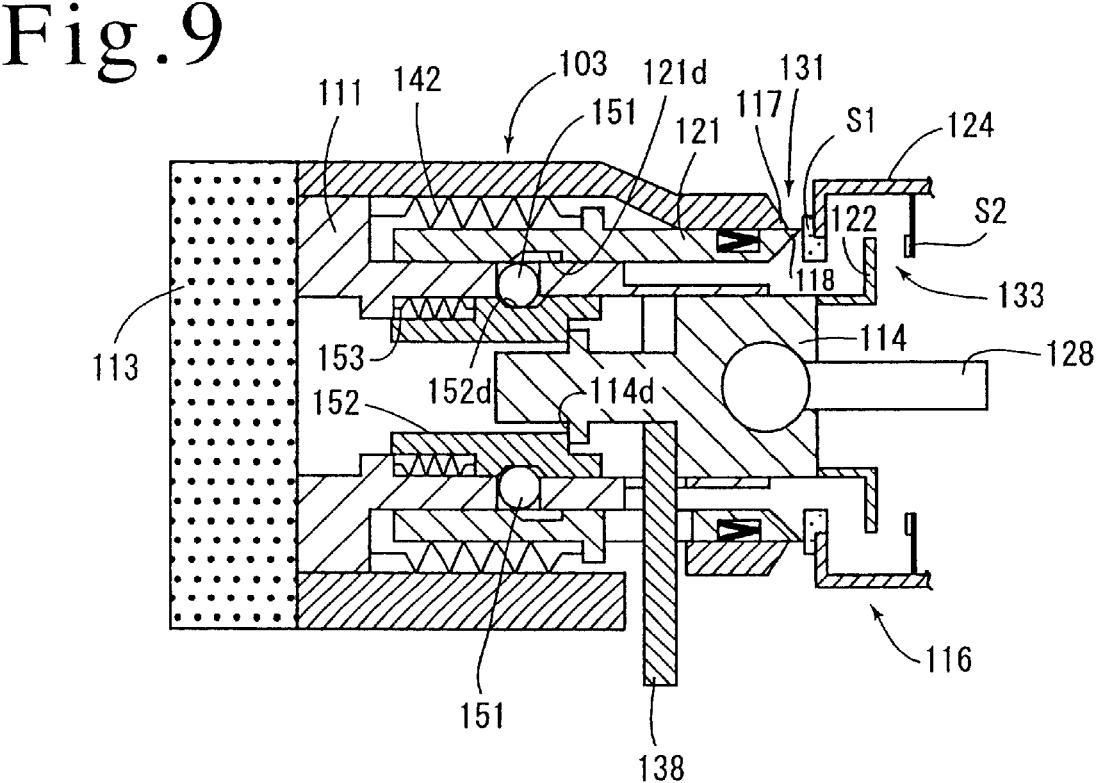
FIG. 9 is a cross section illustrating another operational phase of the components shown in FIG. 7 during an emergency operation.
Figure 10:
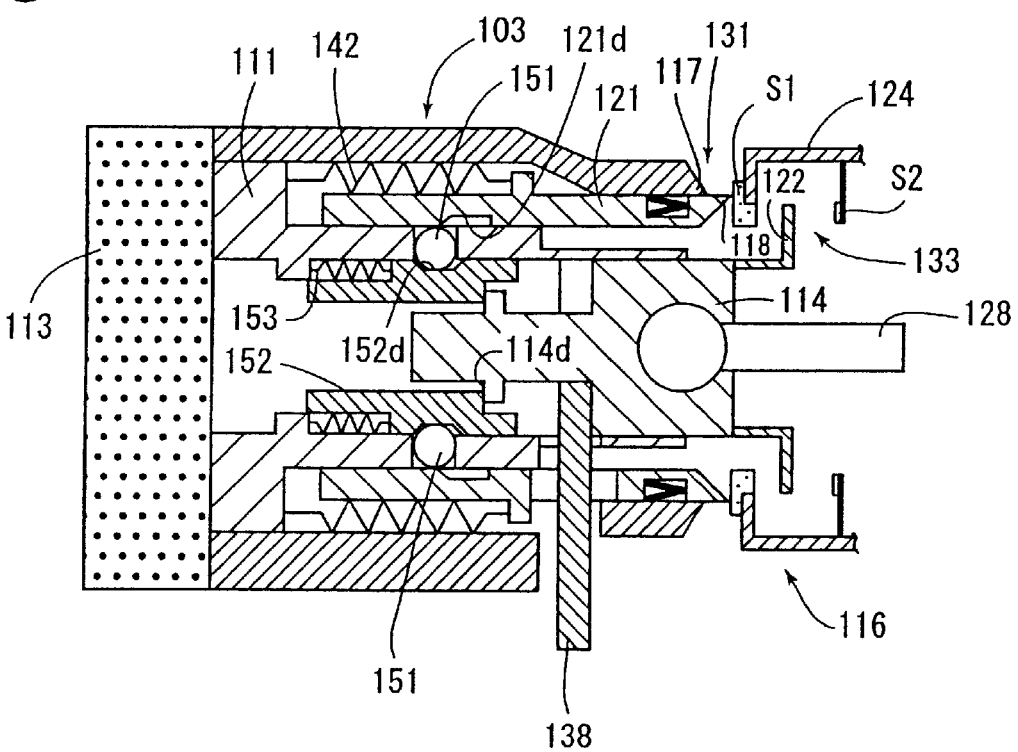
FIG. 10 is a cross section illustrating a further operational phase of the components shown in FIG. 7 during an emergency operation.

As a consequence, the retainer member 152 which is in abutment against the valve plunger 114 is also driven forward through an increased stroke relative to the holder 111, and the entire axial region of the annular groove 152d in the retainer member 152 completely overlaps the radial opening 111d (see FIG. 9). Concurrently, the tubular member 121 retracts rearward under the resilience of the spring 142, and the ball 151 engages the front inclined surface of the annular groove 121d, and is urged inward by the resilience of the spring 142 which is applied through the inclined surface, thus partly projecting beyond the inner end of the radial opening 111d to roll along the inclined surface of the annular groove 152d to engage the latter. This causes part of the ball 151 which has been projecting externally of the radial opening 111d to sink into the radial opening 11d. The tubular member 121 moves rearward relative to the valve body 103 and the holder 111 under the resilience of the spring 142 until the annular projection 121e abuts against the stepped end face 103a on the valve body 103, whereupon it comes to a stop (see FIGS. 9 and 10).

Thus, after the second vacuum valve seat 118 becomes seated on the valve element 124 which has been seated on the first vacuum valve seat 117, the valve element 124 moves away from the first vacuum valve seat 117 and is maintained in a position which is retracted relative to the valve body 103. This allows the atmosphere valve 133 to be opened to a greater opening than during a usual operation, allowing the atmosphere to be rapidly introduced into the variable pressure chamber B to increase the output from the brake booster 101 rapidly. The reaction from the output causes the reaction disc 113 to bulge rearward and to abut against the plate plunger 114a, thus urging the valve plunger 114 rearward. However, an amount of bulge of the reaction disc 113 which is gained until the atmosphere valve seat 122 on the valve plunger 114 becomes seated on the second seat area S2 on the valve element 124 is greater than during a normal operation, and thus the output from the brake booster 101 can be increased by a corresponding amount. In this manner, the second embodiment also allows an increased output to be obtained rapidly during an emergency operation, in a similar manner as in the first embodiment.

Once actuated, if the force of depressing the brake pedal is reduced somewhat, the tubular member 121 and the valve element 124 are maintained in the conditions mentioned above because a condition that the annular projection 121e on the tubular member 121 abuts against the stepped end face 103a on the valve body 103 is retained.

When the brake pedal is released after the actuation of the emergency operation, the key member 138 which is engaged with the valve plunger 114 that is retracting to its inoperative position comes to a stop by abutment against the rear wall 102c of the shell 2, followed by the abutment of the rear end of the retainer member 152 and also the front end face of the radial opening 121b in the tubular member 121 against the key member 138 to stop their movements.

Subsequently, the valve body 103 retracts under the influence of the return spring 108 to abut against the key member 138, and this means that the tubular member 121 is driven forward relative to the valve body 103 and the holder 111, whereby the entire axial region of the annular groove 121d in the tubular member 121 overlaps the radial opening 111d in the holder 111. Accordingly, the ball 151 is urged outward by the inclined surface of the annular groove 152d in the retainer member 152 which is urged by the spring 153, thus continuing the condition that the ball 151 is urged outward by the front, outer peripheral surface of the annular groove 152d. Part of each ball 151 projects externally of the radial opening 111d to be located within the annular groove 121d in the tubular member 121, thus returning to the inoperative condition shown in FIGS. 5, 6 and 7.

As described, it will be apparent that the second embodiment achieves a similar functioning and effects as achieved by the first embodiment.

Third Embodiment

Figure 11:
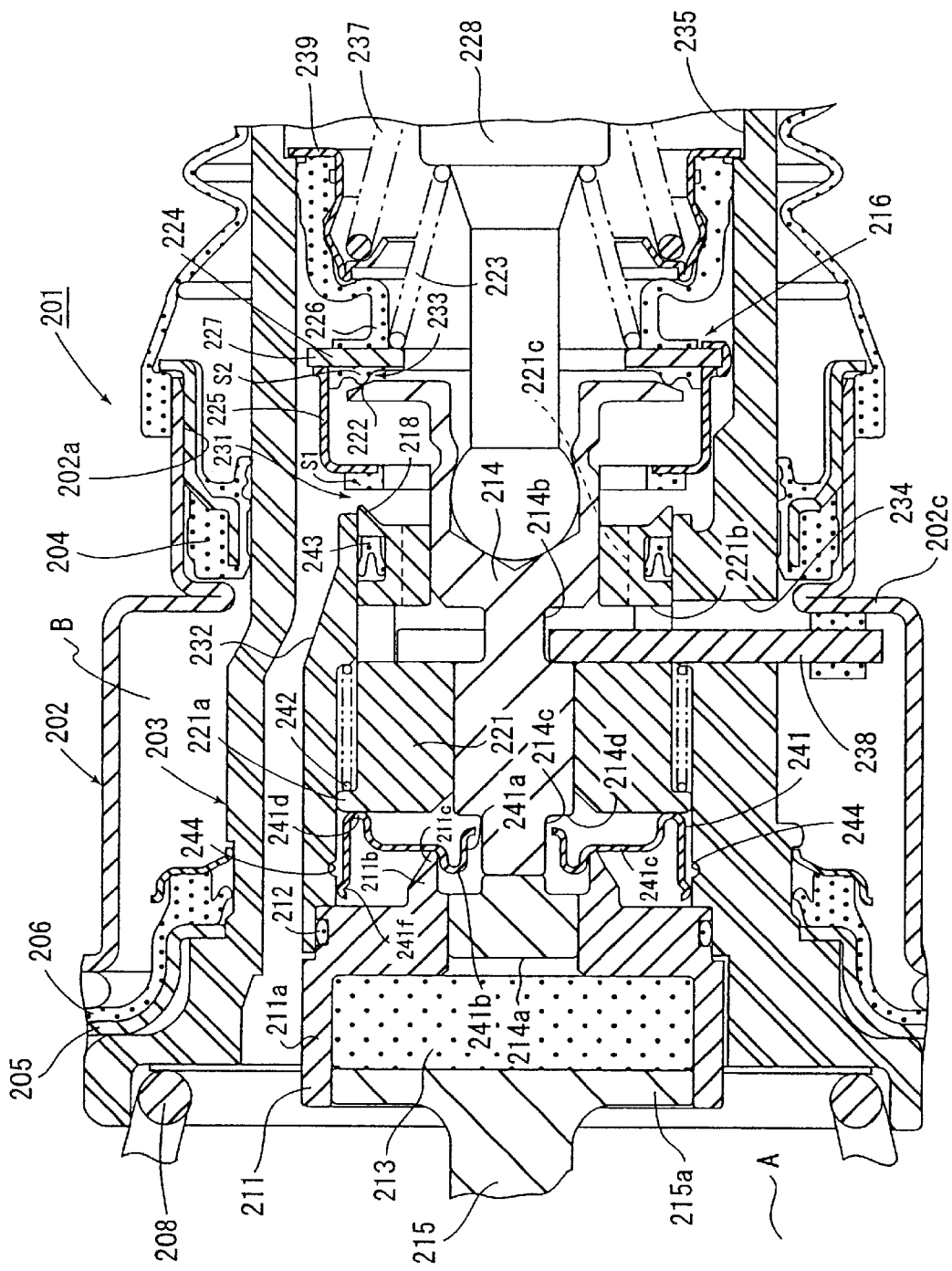
FIG. 11 is a cross section of a third embodiment of the present invention.

FIG. 11 shows a third embodiment of the present invention. In the third embodiment, the first vacuum valve seat 17 provided on the inner periphery of the valve body 3 according to the first embodiment is eliminated, leaving only a vacuum valve seat 218 formed on the rear end of a tubular member 221. In the inoperative condition of a brake booster 201, the vacuum valve seat 218 is located rearward of the step formed on the inner periphery of the valve body 3 on which the first vacuum valve seat 17 is defined according to the first embodiment. In other respects, the arrangement is similar to the first embodiment, and accordingly, corresponding parts to those shown in the first embodiment are designated by like reference numerals as used before, to which 200 is added.

In the third embodiment, when a brake pedal, not shown, is gently depressed in the inoperative condition of the brake booster 201 shown in FIG. 11, an input shaft 228 and a valve plunger 214 are driven forward, whereby a first seat area S1 on a valve element 224 becomes seated on the vacuum valve seat 218 formed on a tubular member 221 to close a vacuum valve 231 while an atmosphere valve seat 222 formed on the valve plunger 214 moves away from a second seat area S2 on the valve element 224 to open an atmosphere valve 233. Subsequent operation remains the same as described above in connection with the first embodiment.

During an emergency operation in which the brake pedal is quickly depressed, the input shaft 228 and the valve plunger 214 are driven forward to allow the valve element 224 to be seated on the vacuum valve seat 218 while the atmosphere valve seat 222 moves away from the valve element 224 to actuate the brake booster 201. The valve plunger 214 then moves through a given stroke or more relative to a valve body 203, in the similar manner as in the first embodiment, whereby a step 214d on the valve plunger 214 abuts against a cylindrical portion 241a of a lever member 241 to cause an angular movement of the lever member 241, thereby causing the tubular member 221 to retract rearward relative to the valve body 203. As a consequence, the valve element 224 which has been seated on the vacuum valve seat 218 on the tubular member 221 retracts relative to the valve body 203, and an engaging tab 241f of the lever member 241 is maintained in a position in which it is engaged with a engaging recess 244 in the valve body 203. Subsequent operation remains the same as described above in connection with the first embodiment. Accordingly, the third embodiment is also capable of delivering an increased output from the brake booster 201 rapidly during an emergency operation, in the similar manner as in the first embodiment.

When the brake pedal is released after the actuation of the emergency brake operation, the brake booster returns to its inoperative condition in the similar manner as in the first embodiment.

As mentioned above, in the third embodiment, the first vacuum valve seat 17 formed on the valve body 3 used in the first embodiment is eliminated. Similarly the first vacuum valve seat 117 on the valve body 103 used in the second embodiment may also be eliminated, leaving only the vacuum valve seat 118 formed on the tubular member 121. Such an arrangement is also capable of achieving an similar functioning and effects as achieved by the first embodiment.

Fourth Embodiment

Figure 12:
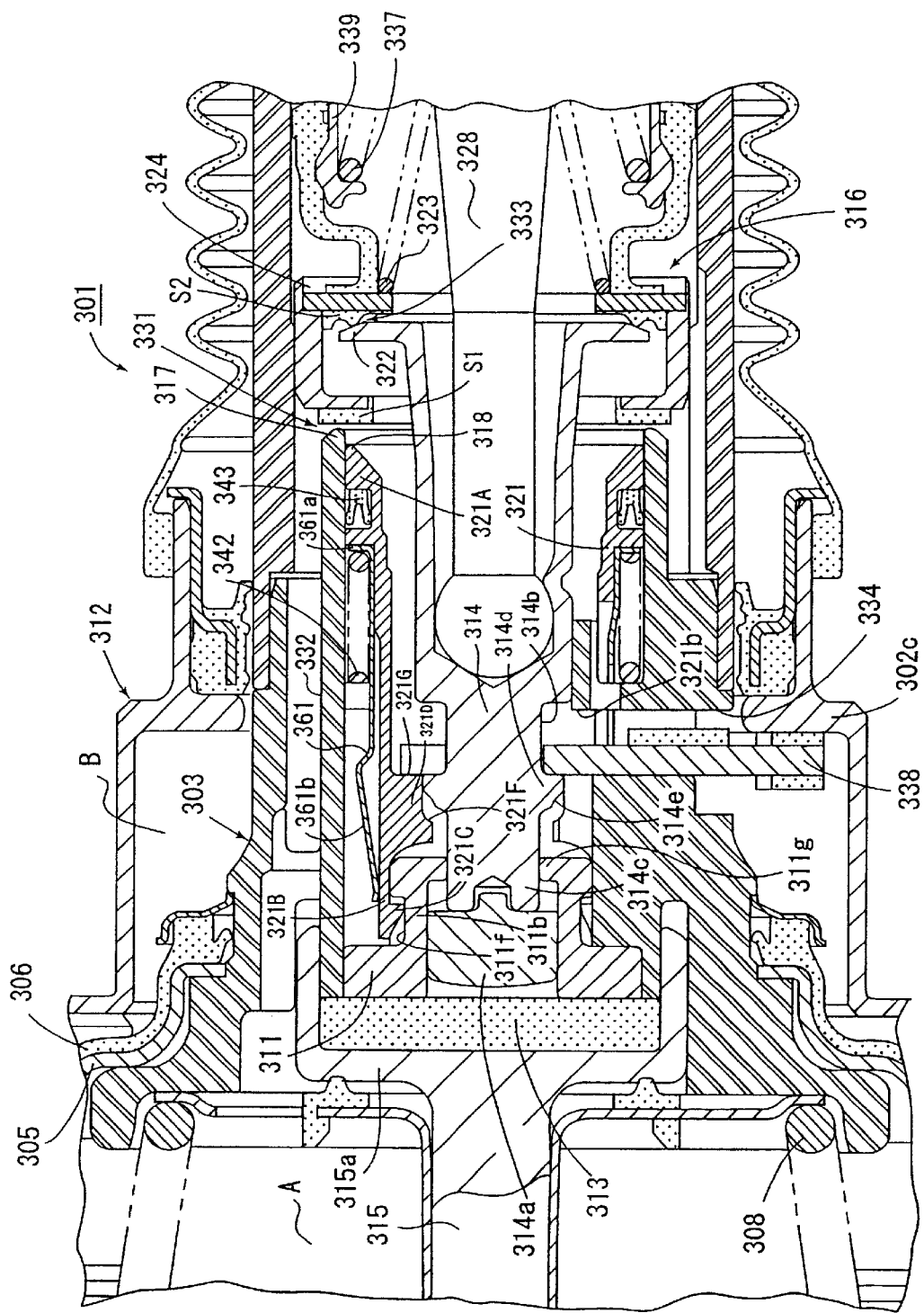
FIG. 12 is a cross section of a fourth embodiment of the present invention.

FIG. 12 shows a fourth embodiment of the present invention. Briefly, in the fourth embodiment, the balls 151, the retainer member 152 and the spring 153 used in the second embodiment shown in FIG. 6 are eliminated, and instead, a tubular resilient member 361 is provided together with an improvement of a tubular member 321 and related parts.

Specifically, in the fourth embodiment, the tubular member 321 includes an increased diameter portion 321A toward the rear end, the outer periphery of which is slidably fitted into the inner periphery of a valve body 303. A rear end of the increased diameter portion 321A defines a second vacuum valve seat 318 in the similar manner as in the second embodiment, and a seal member 343 is mounted around the outer periphery of the increased diameter portion 321A to maintain a hermetic seal between the inner periphery of the valve body 303 and the increased diameter portion 321A.

A substantially cylindrical tubular resilient member 361 is fitted around the outer periphery of the tubular member 321 in a region forward of the increased diameter portion 321A. The tubular resilient member 361 has a rear end which is extended radially outward to provide a flange 361a, which is disposed in abutment against the front end face of the increased diameter portion 321A. A spring 342 is disposed between the flange 361a and an opposing stepped end face of the valve body 303, thus normally urging the tubular member 321 and the tubular resilient member 361 rearward relative to the valve body 303 in an integral manner.

the tubular resilient member 361 includes an axially extending front end 361b, which is formed with notches at a plurality of circumferential locations therearound, the notches extending axially and having increased sizes at their rear ends. In this manner, the front end 361b of the tubular resilient member 361 functions as a leaf spring which urges the outer periphery of the tubular member 321 located toward the front end thereof radially inward. The tubular resilient member 361 is formed with an opening at a given axial position for allowing a key member 338 to pass therethrough.

The tubular member 321 is formed of a synthetic resin, and its front end is formed with axially extending notches at a plurality of circumferential locations therearound, thereby providing a plurality of sections 321B capable of elastic deformation in the radial direction at the plurality of circumferential locations. As mentioned above, these sections 321B are urged radially inward by the front end 361b of the tubular resilient member 361.

An engaging section 321C which projects radially inward is formed on the front end of each section 321B. The engaging section 321C is triangular in axial section, and has a radially extending stepped end face on its rear side and has an inclined surface disposed at an angle of 45° on its front side.

In the present embodiment, a holder 311 has a reduced diameter portion 311b of an axial size which is reduced as compared with the second embodiment, and the outer periphery of the reduced diameter portion 311b is formed with an annular groove 311f serving as an engaging recess of a given width while the inner periphery of the reduced diameter portion 311b is formed with a radial portion 311c toward the rear end.

Each section 321B capable of elastic deformation of the tubular member 321 is fitted around the outer periphery of the holder 311 from the rear side, with each engaging portion 321C engaged with the annular groove 311f in the holder 311. This represents a condition in which the tubular member 321 is retained foremost with respect to the valve body 303, and a second vacuum valve seat 318 formed on the rear end of the tubular member 321 is located slightly forwardly of a first vacuum valve seat 317 which is adjacent to and outward thereof.

The inner periphery of the tubular member 321 is formed with an annular step 321D toward the front end, and the inner peripheral surface of the annular step 321D has a reduced diameter at its front end and an increased diameter at its rear end with a tapered surface 321F having an increasing diameter toward the rear end provided as a boundary therebetween.

The valve plunger 314 is chamfered at a step 314d, and has a tapered surface 314e having a diameter which is reduced toward the front end.

The valve plunger 314 has a reduced diameter portion 314c which slidably extends through the inner peripheral surface of a radial portion 311g of the holder 311, and the front end face of the reduced diameter portion 314c abuts against a plunger plate 314a. In other respects, the arrangement is substantially similar to the second embodiment, and accordingly, corresponding parts to those shown in the second embodiment are designated by like numerals as used before, to which 200 is added in the fourth embodiment.

Figure 13:
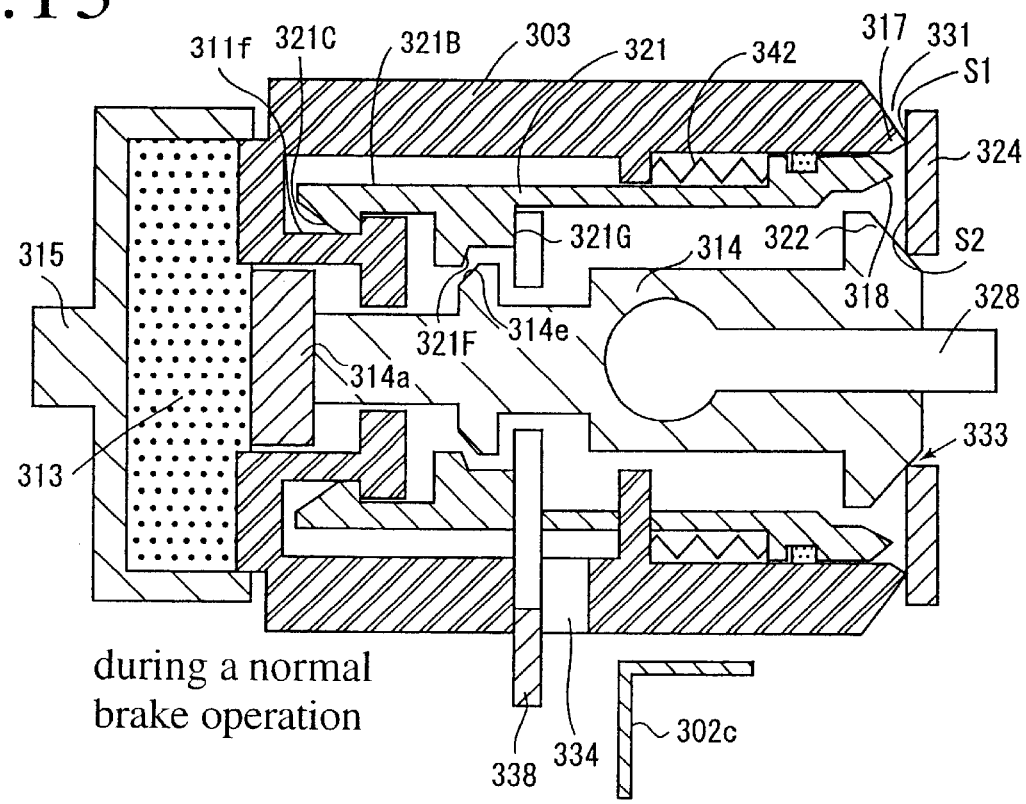
FIG. 13 is a cross section illustrating an operational phase of the components shown in FIG. 12 during a normal brake operation.

As will be described later, during a usual brake operation, an input shaft 328 and the valve plunger 314 are driven forward through a reduced amount which is less than a given stroke relative to the valve body 303, and accordingly, the tapered surface 314e of the valve plunger 314 opposes the tapered surface 321F of the tubular member 321, but does not abut against it. Accordingly, the section 321B capable of elastic deformation of the tubular member 321 cannot be increased in diameter, and the engaging section 321C remains engaged with the annular groove 311f. Hence, the tubular member 321 is maintained in its foremost position relative to the valve body 3 (see FIGS. 12 and 13).

Figure 14:
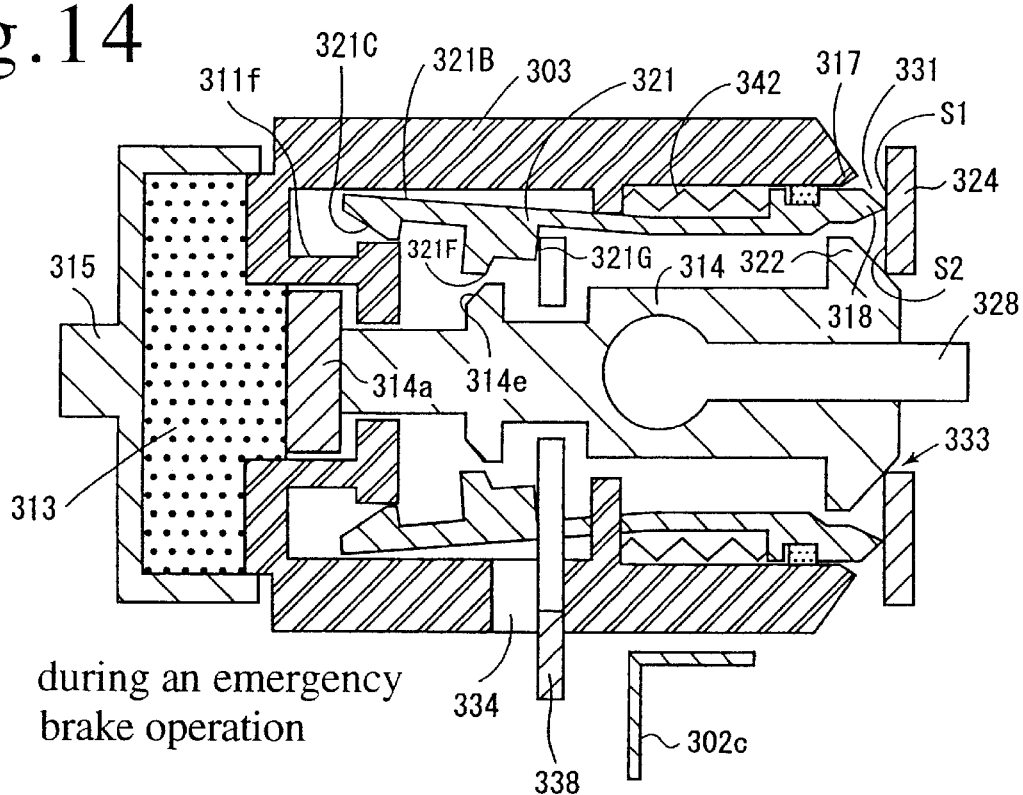
FIG. 14 is a cross section showing another operational phase of the components shown in FIG. 12 during an emergency operation.

By contrast, during an emergency brake operation shown in FIG. 14 in which a brake pedal is quickly depressed, the input shaft 328 and the valve plunger 314 are driven forward through an increased stroke than during the usual brake operation relative to the valve body 303, and the tapered surface 314e of the valve plunger 314 abuts against the tapered surface 321F of the tubular member 321, increasing the diameter of the section 321B capable of elastic deformation of the tubular member 321. Accordingly, the engaging section 321C is disengaged from the annular groove 311f, terminating the connection of the tubular member 321 to the valve body 303. Concomitantly, the tubular member 321 retracts rearward relative to the valve body 303 under the resilience of a spring 342. Consequently, the second vacuum valve seat 318 formed on the tubular member 321 abuts against the first seat area S1 on a valve element 324, which is then retracted rearward. The tubular member 321 has its stepped end face 321G abutting against the key member 338, which in turn comes to a stop by abutment against a rear end face of the variable pressure passage 334 while maintaining the stepped end face 321G in abutment there against, and is thus retained in this position. As a consequence, an atmosphere valve 333 comprising an atmosphere valve seat 322 and a second seat area S2 obtains an opening which is greater than that obtained during a usual operation.

In this manner, retainer means in the fourth embodiment comprises the annular groove 311f, the tubular member 321, the spring 342, the key member 338, the variable pressure passage 334 and the tapered surface 314e of the valve plunger 314. Release means in the fourth embodiment comprises the annular groove 311f, the tubular member 321, the tubular resilient member 361 and the key member 338.

Operation of Fourth Embodiment

With the described arrangement, in the inoperative condition of the brake booster 301 shown in FIG. 12, the valve plunger 314 assumes its retracted end position which is rearmost within a shell 302 as a result of an abutment of the engaging portion 314b of the valve plunger 314 against the key member 338 which abuts against the rear wall 302c of the shell 302. At this time, the tubular member 321 also assumes its retracted end position where the stepped end face 321G abuts against the key member 338. Also at this time, the tapered surface 314e of the valve plunger 314 is located rearward of and opposes the tapered surface 321F of the tubular member 321, while maintaining a clearance therebetween.

In the inoperative condition, the second seat area S2 on the valve element 324 is seated on the atmosphere valve seat 322 to close the atmosphere valve 333. The engaging section 321C of the tubular member 321 is engaged with the annular groove 311f in the holder 311. In other words, the tubular member 321 is maintained at its advanced position relative to the valve body 303. Accordingly, the second vacuum valve seat 318 formed on the tubular member 321 is located slightly forward of the first vacuum valve seat 317, and the both vacuum valve seats 317, 318 are removed from the first seat area S1 on the valve element 324 to open the vacuum valve 338. Accordingly, the chambers A and B communicate with each other, and a negative pressure is introduced into the both chambers. In the inoperative condition described, the rear end face of the reaction disc 313 is slightly spaced from the plunger plate 314a.

During Usual Gentle Brake Operation

If the brake pedal, not shown, is gently depressed in the inoperative condition, the input shaft 328 and the valve plunger 314 are gently driven forward. The valve plunger 314 is advanced only less than a given stroke relative to the valve body 303 and the holder 311 during the usual gentle depression of the brake pedal, and therefore the tapered surface 314e of the valve plunger 314 approaches, but does not abut against the tapered surface 321F of the tubular member 321. Hence, the sections 321B capable of elastic deformation of the tubular member 321 are not deformed in the radially outward direction, and the engaging section 321C remains engaged with the annular groove 311f in the holder 311 (see FIG. 13).

Accordingly, the first seat area S1 on the valve element 324 is seated on the first vacuum valve seat 317 to close the vacuum valve 331, while the atmosphere valve seat 322 is removed from the second seat area S2 on the valve element 324 to open the atmosphere valve 333. Since the vacuum valve 331 is closed and the atmosphere valve 333 is opened, the atmosphere is introduced into the variable pressure chamber B through the variable pressure passage 334. Accordingly, the valve body 303 and the like are driven forward to actuate the brake booster 301.

A brake reaction occurring from the output shaft 315 causes the rear end face of the reaction disc 313 to bulge and to abut against the plunger plate 314a. Accordingly, from this point in time on, the brake reaction begins to be transmitted through the valve plunger 314 and the input shaft 328 to the brake pedal, not shown.

In this manner, when the brake booster 301 is actuated by a usual gentle depression of the brake pedal, the tubular member 321 is retained at its foremost position relative to the valve body 303.

If the brake pedal is released after it is once actuated, the valve plunger 314 and the input shaft 328 retract rearward and the key member 338 abuts against the wall 302c of the shell 302 to stop. Subsequently, the front end face of the engaging portion 314b of the valve plunger 314 abuts against the key member 338 to stop, and subsequently the front end face of the variable pressure passage 334 in the valve body 303 and the stepped end face 321G of the tubular member 321 abut against the key member 338 to stop. In this manner, the valve body 303 and the tubular member 321 return to their inoperative positions shown.

Emergency Brake Operation

When the brake pedal is quickly depressed in the inoperative condition shown in FIG. 12, the valve plunger 314 and the input shaft 328 are driven forward through a given stroke or more relative to the valve body 303 and the holder 311.

Consequently, the first seat area S1 on the valve element 324 is initially seated on the first vacuum valve seat 317 to close the vacuum valve 331, and the atmosphere valve seat 322 is removed from the second seat area S2 on the valve element 324 to open the atmosphere valve 333. The tapered surface 314e of the valve plunger 314 abuts against the tapered surface 321F of the tubular member 321, and then further moves forward, whereby the sections 321B capable of elastic deformation of the tubular member 321 have their diameter increased to allow the engaging section 321C to be disengaged from the annular groove 311f.

Accordingly, the tubular member 321 which is urged rearward by the spring 342 retracts rearward relative to the valve body 303 and the holder 311, and after the second vacuum valve seat 318 is seated on the first seat area S1 on the valve element 324, it causes the valve element 324 to retract further rearward (see FIG. 14). The tubular member 321 ceases to retract relative to the valve body 303 at a retracted position which is reached as the stepped end face 321G abuts against the key member 338, which in turn abuts against the rear end face of the variable pressure passage 334, and is retained at this position.

Consequently, the atmosphere valve seat 322 is largely spaced from the second seat area S2, and the atmosphere valve 333 which comprises these members are retained in a position in which its opening is greater than during a usual brake operation. Consequently, the atmosphere is rapidly introduced into the variable pressure chamber B, allowing the output from the brake booster 301 to rise rapidly. In response to a reaction from this output, the reaction disc 313 bulges rearward to abut against the plate plunger 314a to thereby urge the valve plunger 314 rearward. However, because the amount of bulge of the reaction disc 313 until the atmospher valve seat 322 on the valve plunger 314 is seated on the second seat area S2 on the valve element 324 is greater than during a usual operation, the output from the brake booster 301 increases by a corresponding amount. In this manner, the fourth embodiment also allows an increased output to be obtained rapidly during an emergency operation, in the similar manner as in the described embodiments.

When the brake pedal is released after the actuation of the emergency brake, the input shaft 328 and the valve plunger 314 retract, and the key member 338 abuts against the wall 302c of the shell 302 to stop. In this manner, the tubular member 321 and the valve plunger 314 return to their inoperative positions shown, but the valve body 303 and the holder 311 retract in retarded relationship thereto, and return to their inoperative positions when the front end face of the variable pressure passage 334 abuts against the key member 338 to stop the valve body 303. During this process, it follows that the tubular member 321 is moved forward relative to the valve body 303, and accordingly, the inclined surface of the engaging section 321C of the tubular member 321 is fitted over the outer periphery of the rear portion of the holder 311 and slides forward, whereupon the engaging section 321C engages the annular groove 311f in the holder 311, thus returning to the inoperative position shown in FIG. 12. In this manner, the fourth embodiment is capable of achieving a similar functioning and effects as in the described embodiments.

In the foregoing, the embodiments have been described as an application of the present invention in a single type brake booster, but it should be understood that the present invention is equally applicable to a tandem type (having two pairs of constant and variable pressure chambers) and a triple type (having three pairs of constant and variable pressure chambers) brake booster.

While the invention has been described above in connection with several embodiments thereof, it should be understood that a number of changes, modifications and substitutions therein are possible from the above disclosure without departing from the sprit and scope of the invention defined by the appended claims.

What is claimed is:

1. A brake booster including a valve body slidably disposed in a shell, a power piston mounted on the valve body, a constant pressure chamber and a variable pressure chamber formed forwardly and rearwardly, respectively, of the power piston within the shell, a valve mechanism disposed within the valve body for switchably controlling a supply/discharge of a fluid to or from the variable pressure chamber, and an input shaft for operating the valve mechanism, the valve mechanism comprising a valve plunger connected to the input shaft and having an atmosphere valve seat thereon, a first vacuum valve seat formed on the valve body, and a valve element which is selectively seated on the atmosphere valve seat and the first vacuum valve seat;

the brake booster further comprising a tubular member siidably mounted on the valve body, the tubular member being formed with a second vacuum valve seat which is juxtaposed with the first vacuum valve seat, a retainer for causing the tubular member to retract relative to the valve body to seat the second vacuum valve seat on the valve element as the input shaft is driven forward through a given stroke relative to the valve body from its inoperative position and for retaining the tubular member at a position which is reached as it is retracted through a given stroke relative to the valve body, and a release device for releasing the retention of the tubular member by the retainer to allow the tubular member to return to its inoperative position as the input shaft returns to its inoperative position.

2. A brake booster according to claim 1 in which the second vacuum valve seat is located forwardly of the first vacuum valve seat in its inoperative position such that the valve element is seated only upon the first vacuum valve seat in the inoperative position of the second vacuum valve seat.

3. A brake booster according to claim 1 in which the retainer comprises a lever member disposed for angular movement on the valve body about a fulcrum, and as the valve plunger is driven forward to abut against an inner portion of the lever member, the lever member undergoes an angular movement about the fulcrum to cause an outer portion of the lever member to retract the tubular member relative to the valve body and to cause an engaging portion on the lever member to engage with an engaging portion provide on the valve body, thereby retaining the tubular member at a position which is reached as the tubular member is retracted through a given stroke relative to the valve body.

4. A brake booster according to claim 3 in which the release device comprises a key member which abuts against an internal surface of the shell in its inoperative position to define a retracting limit for the valve plunger when the valve plunger is at its inoperative position, and an abutment surface formed on the tubular member and disposed for abutment against the key member, and when the input shaft returns to its inoperative position, the key member which abuts against the internal surface of the shell abuts against the abutment surface on the tubular member, and the tubular member is then driven forward relative to the valve body to terminate the engagement between the engaging portion on the valve body and the engaging portion on the lever member, thus allowing the tubular member to return to its inoperative position.

5. A brake booster according to claim 1 in which the retainer comprises an engaging recess formed in a lateral surface of the tubular member, an engaging member supported by the valve body so as to be movable in the radial direction, a retaining member operated by the valve plunger for causing an engagement or a disengagement between the engaging recess and the engaging member, and a resilient member disposed to urge the tubular member rearward, and as the input shaft is driven forward through a given stroke relative to the valve body from its inoperative position, the retaining member is operated by the valve plunger to disengage the engaging member from the engaging recess and to retain the tubular member at a position which is reached as the tubular member is retracted through a given stroke relative to the valve body under the resilience of the resilient member.

6. A brake booster according to claim 5 in which the release device comprises a key member which abuts against an internal surface of the shell in its inoperative position to define a retracting limit for the valve plunger when the valve plunger is at its inoperative position, an abutment surface formed on the tubular member and disposed for abutment against the key member, and an abutment surface formed on the retaining member and disposed for abutment against the key member, and as the input shaft returns to its inoperative position, the key member which abuts against the internal surface of the shell abuts against the abutment surface of the tubular member to allow the tubular member to be driven forward relative to the valve body and to abut against the abutment surface of the retaining member to operate the retaining member to bring the engaging recess and the engaging member into engagement to allow the tubular member to return to its inoperative position.

7. A brake booster according to claim 1 in which the retainer comprises an engaging portion formed on a forward portion of the tubular member, an engaging recess formed in the valve body and adapted to be engaged by the engaging portion, and a resilient member disposed to urge the tubular member rearward, and as the input shaft is driven forward through a given stroke relative to the valve body from its inoperative position, the valve plunger causes the engaging portion on the tubular member to be displaced radially to cause the engaging portion to be disengaged from the engaging recess, and the tubular member is retained at a position which is reached as the tubular member is retracted through a given stroke relative to the valve body under the influence of the resilient member.

8. A brake booster according to claim 7 in which the release device comprises a key member which abuts against an internal surface of the shell at its inoperative position to define a retracting limit for the valve plunger when it is in its inoperative position, and an abutment surface formed on the tubular member and disposed for abutment against the key member, and as the input shaft returns to its inoperative position, the key member which abuts against the internal surface of the shell abuts against the abutment surface of the tubular member to move the tubular member forward relative to the valve body, whereby the engaging portion on the tubular member and the engaging recess in the valve body are engaged with one another to allow the tubular member to return to its inoperative position.

9. A brake booster according to claim 7 in which the engaging portion on the tubular member is elastically deformable in the radial direction, and is engaged with the engaging recess in the valve body under the resilience of a second resilient member disposed to urge the engaging portion in the radial direction.

* * * * *